Jan. 27, 1959    N. J. LIAAEN    2,870,848
PITCH ADJUSTING GEAR FOR CONTROLLABLE PITCH PROPELLERS
Filed June 23, 1954    5 Sheets-Sheet 1

INVENTOR
Nils Johannes Liaaen
By Watson, Cole, Grindle & Watson
ATTORNEYS.

Jan. 27, 1959 — N. J. LIAAEN — 2,870,848
PITCH ADJUSTING GEAR FOR CONTROLLABLE PITCH PROPELLERS
Filed June 23, 1954

Jan. 27, 1959  N. J. LIAAEN  2,870,848
PITCH ADJUSTING GEAR FOR CONTROLLABLE PITCH PROPELLERS
Filed June 23, 1954  5 Sheets—Sheet 5

United States Patent Office 2,870,848
Patented Jan. 27, 1959

2,870,848

PITCH ADJUSTING GEAR FOR CONTROLLABLE PITCH PROPELLERS

Nils Johannes Liaaen, Alesund, Norway

Application June 23, 1954, Serial No. 438,723

Claims priority, application Norway April 13, 1954

1 Claim. (Cl. 170—160.39)

The present invention relates to an adjusting gear for the blades of controllable pitch propellers or propeller type turbines and the object of the invention is to provide a gear construction which, without detrimental stresses, is applicable even at the highest loads and numbers of revolutions of the propeller.

The adjustment of the pitch of controllable pitch propellers was previously commonly effected by a force applied on one side only of the axis of rotation of the blade in question. Due to this force the blade bearing consequently is subjected to a most substantial stress in addition to the stresses derived from water pressure and, possibly, centrifugal forces on the blade, such additional stress being alternatively added to or subtracted from the bearing stresses due to water pressure, and possibly centrifugal forces, in dependence upon the hydraulic load on and pitch of the blade. The additional stress due to the adjustment force may amount to considerable values, even up to one half of the bearing stresses due to water pressure and, possibly, centrifugal forces.

According to the present invention, the inconvenience referred to, which particularly in propellers of high effect and a high number of revolutions may be most embarrassing, may be removed if the adjustment of the blade pitch is effected by means of pull rods disposed parallelly to the propeller axis in such a manner that at least one rod is movable in a direction opposite that of the remaining rods, whereby additional stresses due to each individual rod are compensating each other, the resultant stress being nought or approximately nought.

The transmission of the pull rod movements to the blades for the purpose of controlling the pitch of the same may conveniently be effected by providing each blade base with two pins extending parallelly to the axis of rotation of the blade in question and substantially diametrically to the said axis and each adapted to cooperate with one of the two pull rod sets, to the effect that the pins are moved in mutually opposite directions when the pull rods are reciprocated, thereby effecting a turning of the blade in question. It is, it is true, previously suggested to utilize two crank pins at each blade base each adapted to be moved in its own oblique slot in a guide member which may be reciprocated in the axial direction of the propeller hub, but prevented from being rotated about the said axis by special guides in the hub. As such pins are actuated by one and the same guide member they are moved in the same direction along the hub axis. Consequently the forces applied to the pins in the direction of movement of the guide member are of the same direction on both pins, whereby the stresses on the blade bearing due to the said forces are added to and subtracted from, respectively, the stresses due to the water pressure and centrifugal forces, to the effect that the unilateral load referred to above is even more pronounced.

In the practical construction of the cooperation between the two pull rod sets and the associated crank pins, at least one of the pull rods may, in a manner known per se cooperate with the associated pins through a connecting link, or each of the pull rods may cooperate with the associated pins, also in a manner known per se, through a crank gear, but most conveniently one of the pull rods is cooperating with the associated pins through a connecting link while the other pull rod or rods is or are cooperating with the associated pin through a crank gear. The two pull rods may be coaxially disposed, one being conveniently made in the form of a solid rod and the other as a tube coaxially disposed around the first one, or the two rods may be disposed parallel to each other. At all events, the two pull rods should be so dimensioned and actuated as to make the volume displaced by each rod during the movements of the same equal for each rod set so as to eliminate any volume variations and thereby any pressure differences in the hub during the pull rod movements.

The movements of the two pull rods may, according to the invention be derived from a cylinder, preferably disposed in the shafting of the propeller or in the hub proper, preferably aft of the propeller blades, the cylinder being provided with two pistons, each associated with one pull rod set and adapted to perform mutually oppositely directed reciprocating movements in step with the desired movements of the blade base pins.

The connections between the individual pull rods and the associated pins may be formed in any manner known per se according to the principles adopted, i. e. the use of two connecting links, two crank gears or one connecting link and one crank gear to each blade. As mentioned, a very suitable construction is obtained by using one connecting link and one crank gear. By using two coaxial rods, the inner solid rod is suitably associated with the crank gear, while the coaxial tube is associated with the connecting link, whereas by the use of one central rod and more circumferentially disposed rods, the central rod may be associated with the connecting link and each of the remaining rods with a crank gear. In both cases the two transmission systems are non-interfering in spite of the axial length required by the crank gear.

In order to obtain a simple and robust structure of a short constructional length in the axial direction of the propeller hub and, at the same time suitably adapted to a hydraulically favourable shape of the hub, the connecting link which is associated with one of the pull rods, and preferably made common to all blades of the propeller, may be made split in a direction perpendicular to the axial direction so as to make each of the guide faces of the connecting links on which the connecting link blocks are to be moved lie in a separate part of the connecting link, thereby highly simplifying the assembly of the transmission structure by introduction through the aft hub end. The separate connecting link parts may be assembled by axial bolts and secured in axial direction to their actuating rod by being clamped between a collar on the rod and a nut at the free, aft end of the same. It is however more convenient to provide the rod with an integral ring (flange) which is enclosed by the separate connecting link parts, suitably by using a diametrically split loose ring, whereby the assembly of the connecting link and the securing of the same on the pull rod may be effected by the axial bolts referred which bolts are easily and simply actuated during the assembly of the hub.

The accompanying drawings illustrate two embodiments of an adjusting gear according to the invention as applied to a propeller provided with three blades.

Figure 1:
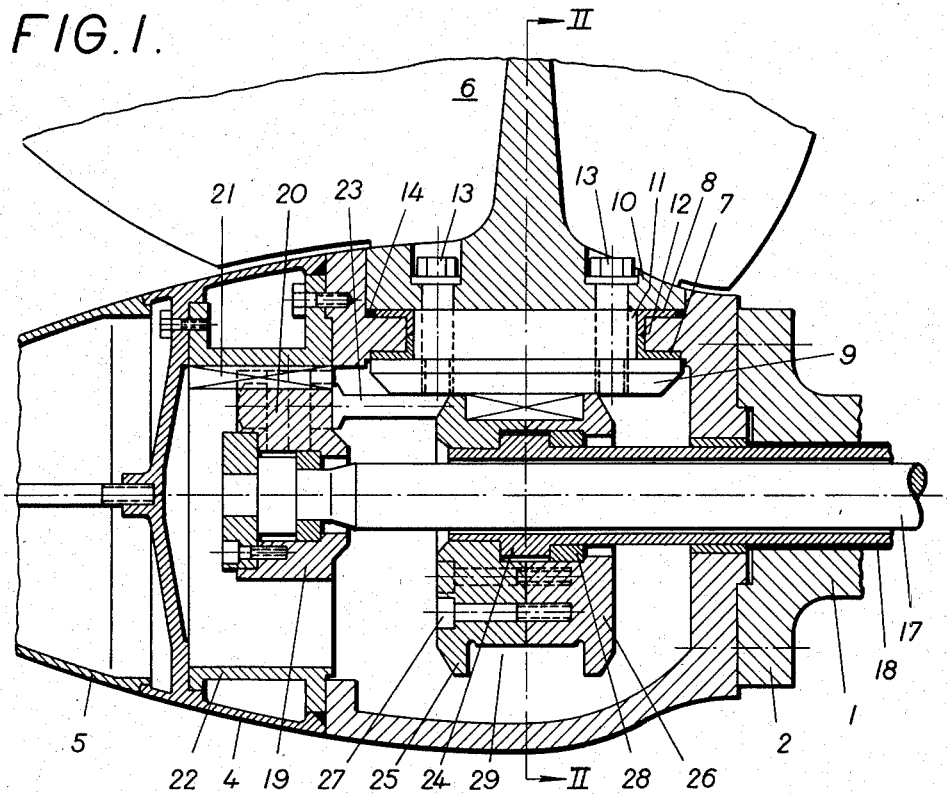
Figure 1 is an axial sectional view of the hub in one embodiment.
Figure 3:
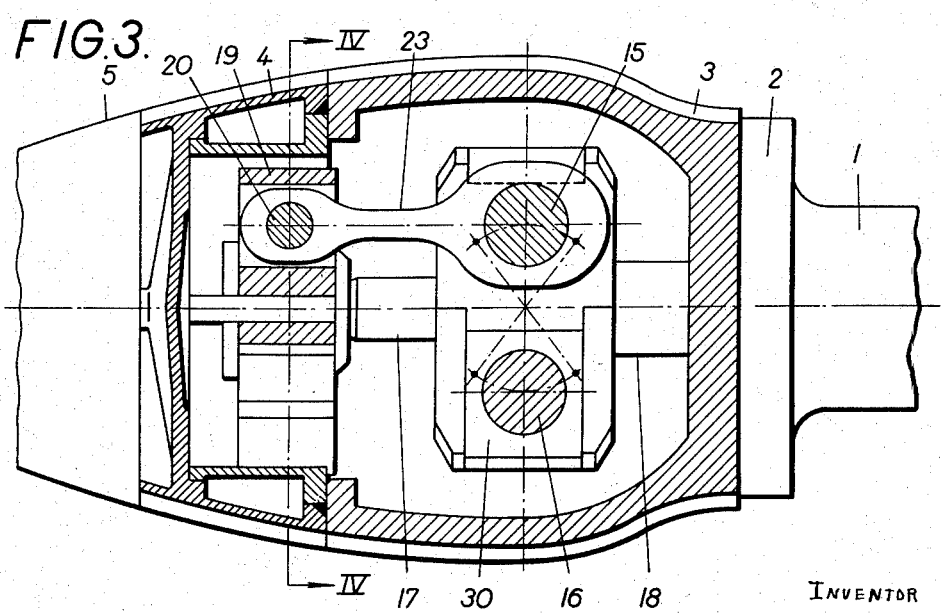
Figure 3 is a sectional view taken along the line III—III of Figure 2, parallel to the axis.
Figure 2:
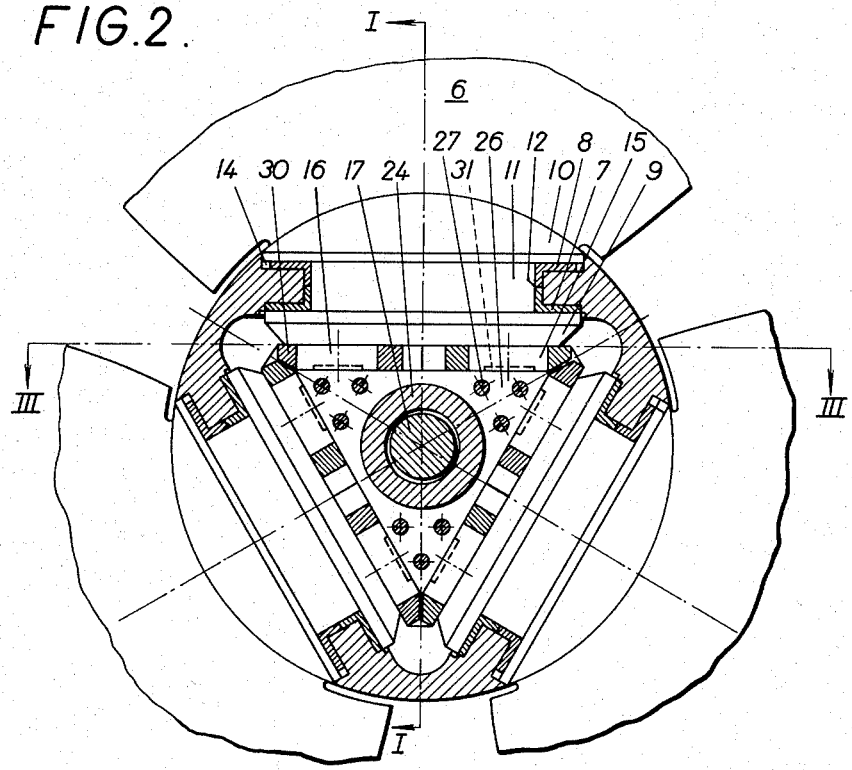
Figure 2 is a corresponding sectional view perpendicular to the hub axis, taken along the line II—II of Figure 1.

In the drawing, 1 is the propeller shaft which is made with a central bore and secured to the hub 3 through a flange 2. The hub 3 is open at the aft end and provided with a caplike closure 4 and is ended off by a suitably shaped cap 5. The hub 3 is provided with openings for the accommodation of the individual propeller blades 6, each of which is provided with inner and outer mounting faces 7 and 8, respectively for the inner and outer parts 9 and 10, respectively of the blade base, the blade base shaft 11 being fitted into a cylindrical bore 12 in the hub wall. The inner blade base part 9, the crank disc, is connected to the outer part 10 by means of bolts 13. A sealing ring 14 is provided between the outer mounting face 8 and the blade base part 10 for the purpose of preventing water from entering and oil to leave the hub along the blade base shaft. The crank disc 9 is provided with two integral pins 15 and 16, respectively, situated approximately diametrically to the axis of rotation, indicated at II—II in Figure 1, of the blade.

Figure 4:
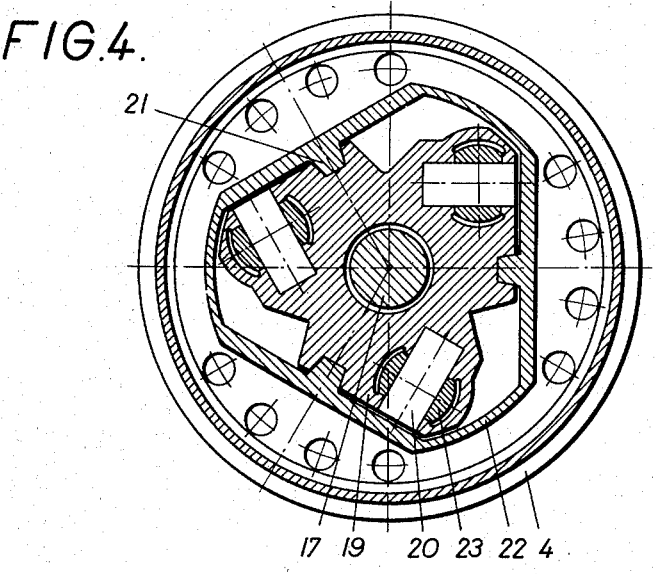
Figure 4 is sectional view perpendicular to the hub axis, taken along the line IV—IV of Figure 3.

The propeller shaft 1 is, as indicated, made with a bore and in the embodiment shown in Figures 1 to 5, a rod 17 and a tube 18 are extending in the said bore, coaxially to each other and to the shaft 1. The rod 17 is extending through the hub 3 into the caplike closure 4 and is therein carrying a cross head 19 having a number of pins 20 corresponding to the number of blades of the propeller. The cross head 19 is guided by means of ribs 21 provided in a guide member 22 secured in the closure 4, as indicated in Figure 4. Each pin 20 carries a crank arm 23 the opposite end of which is mounted on one of the pins 15 of a crank disc 9. Consequently, an axial movement of the rod 17 will cause a crank like movement of the pins 15 and thereby a rotation of the crank discs 9 together with the blades 6 about their respective axis of rotation.

The tube 18 enclosing the rod 17 is extending into the hub 3 and is near to the free end provided with a flange 24. Two parts 25 and 26, respectively of the connecting link common to all the propeller blades 6 are mounted to either axial sides of the flange 24. The parts 25 and 26, which together define a cross head or connecting link, are assembled in the axial direction by means of bolts 27, an annular member 28 being provided between the part 26 and the flange 24, the aft face of the annular member 28 bearing against the fore face of the flange 24 and the peripherial portion of the member 28 being in engagement with an annular slot provided in the member 26, to the effect that the bolts 27 are keeping the members 25, 26 and the annular member 28 with slide fit on the flange 24. The inner diameter of the member 26 is slightly greater than the outer diameter of the flange 24 to the effect that the member 26 may be passed in a fore direction around the flange 24. The members 25 and 26 are provided with exterior recesses forming together guides 29 to each of the connecting link blocks 30 each enclosing a pin 16 of a crank disc 9. By an axial movement of the tube 18, the pins 16 and together therewith the crank discs 9 and the associated blades 6 consequently will be rotated about the axis of rotation of the respective blades, each connecting link block or slide 30 thereby sliding along the respective guide 29 formed by the members 25 and 26.

For the purpose of preventing the connecting link in being caused to rotate and, at the same time, to center the members, special pieces 31 are suitably inserted at the free ends of the pins 15 and 16, each provided with a sliding face cooperating with a corresponding face on the connecting link.

When the adjusting gear of the invention is to be assembled, the tube 18 and the rod 17 is initially positioned in the shaft 1. The connecting link member 26 is then inserted over the flange 24, such insertion being permitted by the inner diameter of the member 26 being, as mentioned, slightly greater than the outer diameter of the flange 24. The ring 28 is then inserted. For this purpose the ring 28 is made diametrically split so as to facilitate the insertion of the ring fore of the flange 24. The member 26 and the ring 28 are then positioned relatively to the flange 24. Each of the connecting link blocks 30 is passed on to the corresponding pin 16 and positioned in that portion of the pertaining guide 29 which is formed by the member 26. The crank arms 23 are then mounted on the respective pins 15, whereupon the connecting link member 25 is passed into contact with the flange 24 so as to complete the guides for the connecting link blocks 30, and the members 25 and 26 together with the ring 28 are drawn against each other by means of the bolts 26. The cross head 19 is mounted on the rod 17 and the cross head pins 20 inserted to connect the cross head and the rod to each other. The guide member 22 is passed on to the cross head 19 and is bolted to the hub 3 and is thereby secured against rotation about the hub axis. The closure 4 and the cap 5 are then placed in position and the hub is complete.

Figure 5:
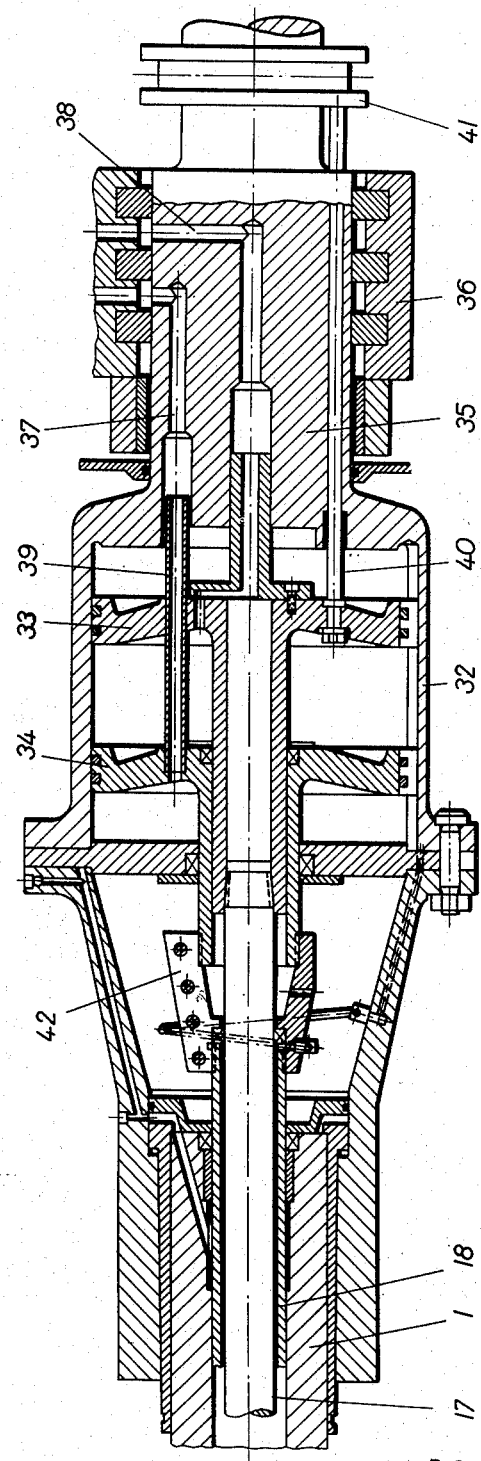
Figure 5 is an axial sectional view of the cylinder from which the rod movements are derived, in one embodiment.

A servo motor structure as shown in Figure 5 may be used for the purpose of actuating the rod 17 and the tube 18 in such a manner that the pins 15 and 16 are always subjected to forces directed in axially opposite directions for the rotation of the crank discs 9.

The servo motor structure is in the form of a cylinder 32 situated in the servo motor axis and coaxial with the same. The cylinder 32 is provided with two pistons 33 and 34, respectively, each secured to the rod 17 and the tube 18, respectively.

The fore bottom of the cylinder 32 is connected to the servo motor shaft 35 which at its fore end is surrounded by an annular member 36 provided for the feeding of oil or another pressure medium to the bores 37 and 38 of the shaft 35 under the control of a distributor slide which is not shown. The fore bore 38 carries oil to and from the space of the cylinder 32 situated between the pistons 33 and 34, while the bore 37 carries oil to and from the cylinder spaces fore and aft of the two pistons, the two latter spaces being interconnected through a telescopic tube 39, secured to the aft piston 34 and passing under sealing through the fore piston 33. The piston 33 also is connected to two or more return rods 40, the other ends of which are secured to a return ring 41 which in a usual manner by means which are not shown returns the distributor slide upon displacement for the initiation of a movement of the servomotor pistons 33 and 34.

The connection between the piston 33 and the rod 17 may be effected for instance by engagement between screw threads on the rod 17 and on the piston rod integral with the piston, while the piston 34 through the piston rod of the same is connected to the tube 18 by means of a sleeve coupling 42 made in two halves which are bolted together. The coupling 42 is provided with internal screw threads adapted for engagement with corresponding screw threads on the piston rod and the tube 18, respectively. The coupling 42 is provided with a sealing ring on the rod 17 and means are arranged for the feeding of lubricating oil to the propeller hub through the clearance between the rod 17 and the tube 18, and the return of the same through the clearance between the tube 18 and the wall of the bore of the shaft 1.

Consequently, a movement of the pistons 32 and 33 under the control of the distributor slide causes an axial displacement of the rod 17 and of the tube 18, and thereby a turning of the propeller blades 6 in the manner indicated above. When the distributor slide is so adjusted as to feed oil through the bore 37 to the spaces to either sides of the pistons 32 and 33, the pistons are moved against each other, a corresponding quantity of oil being simultaneously forced out of the space between the pistons. As the pistons 33 is connected to the pins 15 and the piston 34 is connected to the pins 16, the pistons are moved approximately the same distance in opposite directions and apply forces on the pins corresponding to the piston area and the oil pressure. In order to obtain displacement in the opposite direction, the distributor slide is so adjusted as to feed a quantity of oil into the space between the pistons 33 and 34, a corresponding quantity being forced out from each of the spaces behind the pistons, whereby the pistons are moved away from each other as previously indicated in mutually opposite directions, thereby applying forces to the pins corresponding to piston area and oil pressure as before.

Figure 6:
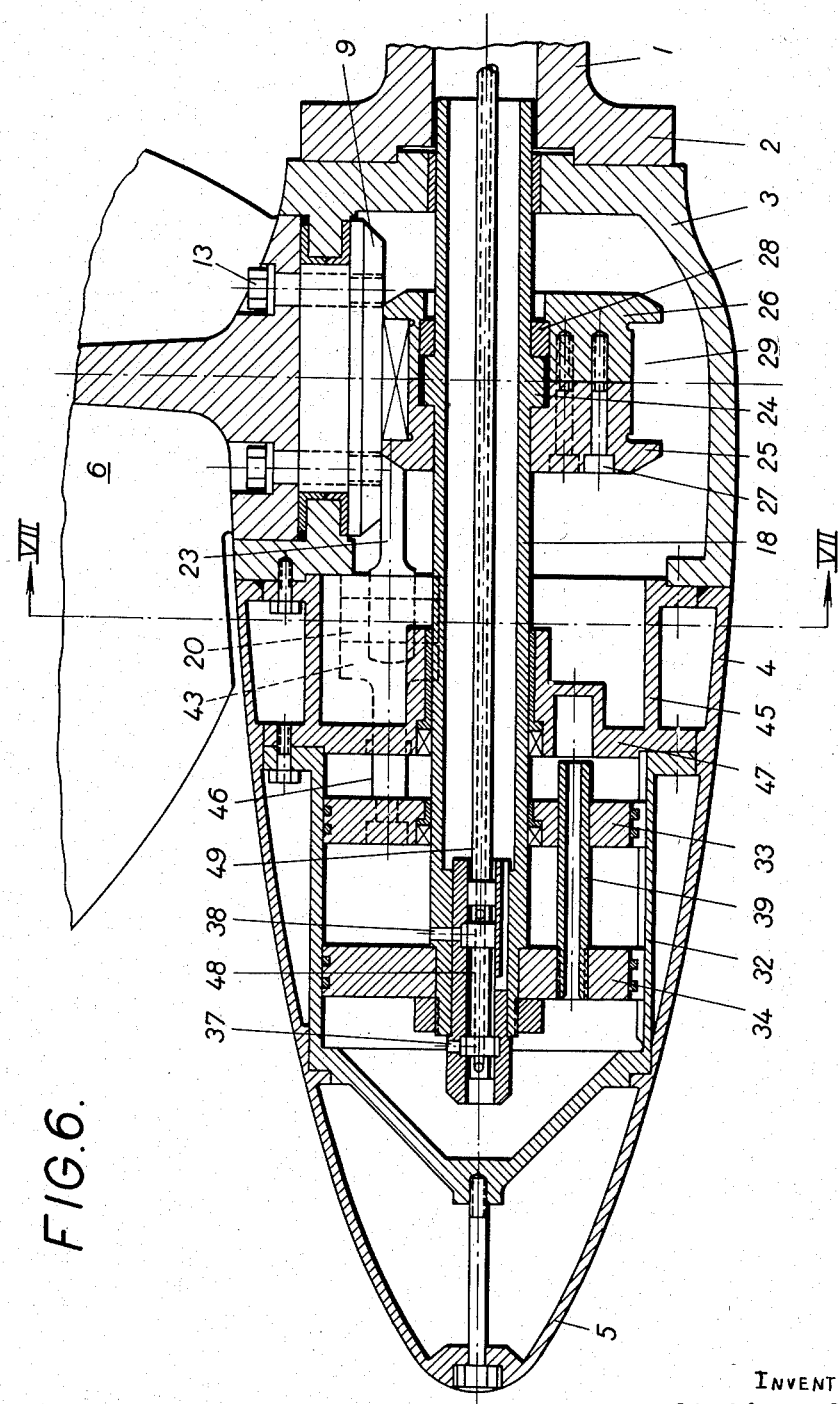
Figure 6 is a sectional view corresponding to Figure 1, in a second embodiment.
Figure 7:
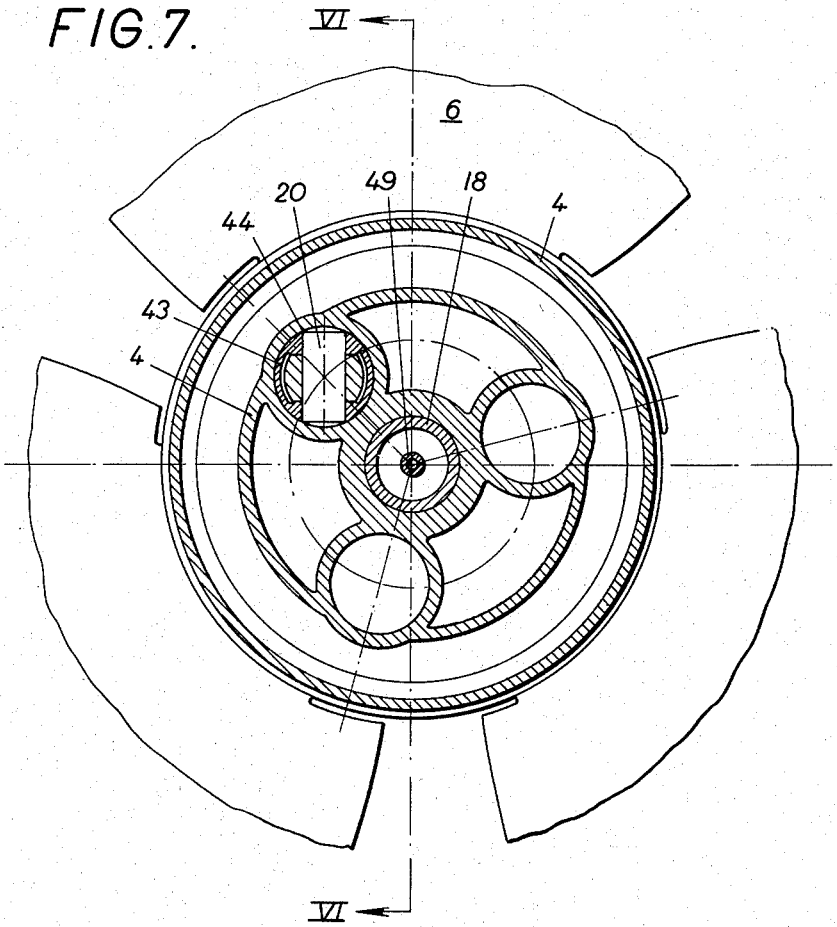
Figure 7 is a sectional view taken along the line VII—VII of Figure 6.

The Figures 6 and 7 illustrate another embodiment of the gear according to the invention, wherein the control device corresponding to that shown in Figure 5 is arranged in the hub proper, in the aft part of the same.

Such members of the embodiment shown in Figures 6 and 7 which correspond to members of the embodiment described above with reference to the Figures 1–5, are given the same reference numbers as in the said figures.

The difference in principle between this embodiment and that which is described above resides, as mentioned, in the fact that the servo motor cylinder 32 with the pistons 33 and 34 is now arranged in the hub aft of the propeller blades 6, the distributor slide controlling the feed of the pressure medium to the cylinder 32 being now arranged axially in the cylinder 32.

The hub 3 with the blades 6 and the arrangement of the same in the hub 3 with the crank discs 9 with pins 15 and 16 etc. are as those of the first embodiment. The same is the case with the connecting link 25, 26 with its guides 39 and its connecting blocks 30, as well as the connection to the crank arms 23.

The tubular rod 18 carrying and actuating the connecting link 25, 26 is, however, in this case extending aft in the hub 3 and is integral with the piston 34 situated in the cylinder 32 which is flange connected to the cylinder bottom 47 which, in turn is flange connected to the aft rim of the hub 3 through the neck member 45.

Each of the crank arms 23 of the pins 15 of the crank discs 9 is, in this case connected to a cross head 43 through pins 20, the cross head 43 being guided in specially formed guides 44 in the cylinder bottom 47, Figure 7. Instead of being actuated by the common central rod 17, as in the first embodiment, each cross head in this case is actuated by a rod 46 connected to the second piston 33 of the cylinder 32. The tube 18 as well as the rods 46 are passed under sealing through the cylinder bottom 47.

In this embodiment, the control of the supply and return of pressure medium to the cylinder 32 to the different sides of the pistons 33 and 34 is effected by means of a distributor slide 48 which receives pressure medium through and is moved by a tubular rod 49 axially arranged relatively to the tube 18. The return oil is passed through the tube 18 around the hollow rod 49. The slide 48 is in the usual manner provided with abutments, not shown, limiting the displacements of the slide. The distribution of the pressure medium and the displacement of the piston 33 and 34 for the purpose of turning the pins 15 and 16 and thereby the crank discs with the blades 6 is effected in the same manner as described with reference to the first embodiment.

Although, both the practical embodiments of the gear according to the invention are shown provided with a connecting link and crank gear, obviously the principle of the oppositely displaceable pull bars may also be applied to a rack and pinion gear, or other transmission means which might suit the local conditions.

In order to avoid possible variations in the pressure in the hub 3 caused by variations in the axial positions of the rod 17 of the rods 46 and the tube 18 with associated means, it is convenient to dimension the rods and the tube in such a manner with a view to the displacement they are to effect that they are always displacing equal volumes in the hub 3.

I claim:

A controllable pitch propeller including a hollow hub rotatable about a predetermined axis, a plurality of blades respectively journalled in said hub for pitch changing adjustment about axes extending generally radially to said rotational axis, the inner ends of said blades being spaced from said axis, a cross head positioned on said rotational axis between said inner ends of the blades, means supporting and guiding said cross head for adjustment along said rotational axis, a plurality of slides carried by said cross head for movement therewith, each said slide being guided for movement on said cross head transversely to said rotational axis and to the pitch changing axis of one of said blades, and a pivot pin interconnecting each said slide and its said one blade, said pivot pin having its axis eccentric and parallel to the pitch changing axis of said one blade, in combination with a second pivot pin eccentrically positioned on the inner end of each said blade in diametrically opposed relation to said first pivot pin, a second cross head axially spaced from the inner ends of said blades, means supporting and guiding said second cross head for adjustment along said rotational axis, connecting rods extending axially between and interconnecting said second cross head and each of said second pivot pins, and means interconnecting said cross heads for movement in opposite axial directions, said connecting rods respectively extending and movable between the inner end of each said blade and the said first cross head.

References Cited in the file of this patent

UNITED STATES PATENTS

| | | |
|---|---|---|
| 1,510,436 | Englesson | Sept. 30, 1924 |
| 2,255,920 | Englesson | Sept. 16, 1941 |
| 2,355,039 | Eves | Aug. 1, 1944 |
| 2,536,565 | Ostergren | Jan. 2, 1951 |
| 2,548,045 | Nichols | Apr. 10, 1951 |
| 2,686,569 | Bruce | Aug. 17, 1954 |
| 2,693,243 | Strandell et al. | Nov. 2, 1954 |

FOREIGN PATENTS

| | | |
|---|---|---|
| 518,181 | Germany | Feb. 13, 1931 |